(12) United States Patent
Lee (10) Patent No.: US 7,708,412 B2
(45) Date of Patent: May 4, 2010

(54) LIGHT SHIELDING MEMBER FOR A MICRO-MIRROR PROJECTION SYSTEM

(75) Inventor: Hyun Ki Lee, Choongjoo-si (KR)

(73) Assignee: LG Electronics Inc., Seoul (KR)

( * ) Notice: Subject to any disclaimer, the term of this patent is extended or adjusted under 35 U.S.C. 154(b) by 876 days.

(21) Appl. No.: 11/501,884

(22) Filed: Aug. 10, 2006

(65) Prior Publication Data
US 2007/0035701 A1 Feb. 15, 2007

(30) Foreign Application Priority Data
Aug. 12, 2005 (KR) .................. 10-2005-0074317

(51) Int. Cl.
G03B 21/28 (2006.01)
(52) U.S. Cl. ........................................... 353/81
(58) Field of Classification Search .............. 353/30, 353/81, 87; 348/771, 842
See application file for complete search history.

(56) References Cited

U.S. PATENT DOCUMENTS

| | | | | |
|---|---|---|---|---|
| 5,967,636 | A * | 10/1999 | Stark et al. ............... | 353/84 |
| 6,179,424 | B1 * | 1/2001 | Sawamura ................. | 353/33 |
| 6,357,878 | B1 * | 3/2002 | Sawamura ................. | 353/33 |
| 6,508,556 | B1 * | 1/2003 | Ueda ....................... | 353/74 |
| 6,560,048 | B1 | 5/2003 | Okamori et al. | |
| 6,582,080 | B2 * | 6/2003 | Gibbon et al. ............. | 353/20 |
| 6,583,940 | B2 * | 6/2003 | Nishikawa et al. ......... | 359/738 |
| 6,652,105 | B1 * | 11/2003 | Peterson et al. ............ | 353/98 |
| 6,698,902 | B2 * | 3/2004 | Kawano et al. ............ | 353/99 |
| 6,824,275 | B2 * | 11/2004 | Penn ....................... | 353/81 |
| 6,886,947 | B2 * | 5/2005 | Konishi .................... | 353/119 |
| 6,951,394 | B2 * | 10/2005 | Chang et al. .............. | 353/33 |
| 7,029,130 | B2 * | 4/2006 | Cannon et al. ............. | 353/97 |
| 7,048,389 | B2 * | 5/2006 | Lee ......................... | 353/101 |
| 7,118,227 | B2 * | 10/2006 | Sannohe et al. ............ | 353/97 |
| 7,207,678 | B2 * | 4/2007 | Penn ....................... | 353/81 |
| 7,360,905 | B2 * | 4/2008 | Davis et al. ............... | 353/81 |
| 7,397,536 | B2 * | 7/2008 | Shimizu ................... | 355/67 |
| 2002/0036833 | A1 | 3/2002 | Miyata et al. | |
| 2002/0140910 | A1 * | 10/2002 | Stark et al. ................ | 353/84 |

(Continued)

FOREIGN PATENT DOCUMENTS

EP 1 434 078 A1 6/2004

*Primary Examiner*—Georgia Y Epps
*Assistant Examiner*—Danell L Owens
(74) *Attorney, Agent, or Firm*—Birch, Stewart, Kolasch & Birch, LLP (57) ABSTRACT

A DLP optical system is provided. The DLP optical system includes a lamp unit, an optical engine unit, a DMD, a prism, a projection lens, and a light-blocking part. The lamp unit provides light, and the optical engine unit is optically connected with the lamp unit, has optical parts for converting light incident from the lamp unit into an image signal therein, and includes a primary lens for transmitting the image signal. The DMD reflects the image signal transmitted from the primary lens, and the prism is formed closely to the DMD to adjust a path of light. The projection lens projects an on-beam of light from the prism that contributes to forming of an image onto a screen. The light-blocking part is provided on an incident side of the projection lens to transmit only the on-beam and shields light of a flat state region located between an on-beam and an off-beam.

12 Claims, 6 Drawing Sheets

U.S. PATENT DOCUMENTS

| | | | |
|---|---|---|---|
| 2003/0123029 A1* | 7/2003 | Penn | 353/30 |
| 2003/0123163 A1* | 7/2003 | Penn | 359/833 |
| 2003/0147158 A1* | 8/2003 | Penn | 359/833 |
| 2004/0057023 A1* | 3/2004 | Colpaert | 353/85 |
| 2004/0119950 A1* | 6/2004 | Penn et al. | 353/97 |
| 2004/0136044 A1* | 7/2004 | Miller et al. | 359/223 |
| 2005/0030609 A1* | 2/2005 | Hewlett et al. | 359/245 |
| 2005/0140933 A1* | 6/2005 | Cannon et al. | 353/37 |
| 2005/0264792 A1* | 12/2005 | Penn et al. | 355/97 |
| 2006/0033979 A1* | 2/2006 | Gupta et al. | 359/290 |
| 2006/0274273 A1* | 12/2006 | Mihalakis | 353/20 |
| 2008/0180636 A1* | 7/2008 | Boothroyd | 353/8 |

* cited by examiner

FIG.1

RELATED ART

LIGHT SHIELDING MEMBER FOR A MICRO-MIRROR PROJECTION SYSTEM

BACKGROUND OF THE INVENTION

1. Field of the Invention

The present invention relates to an optical system, and more particularly, to a digital light processing (DLP) optical system for solving a contrast problem of an image that is caused by light discarded in the DLP optical system.

2. Description of the Related Art

A DLP optical system is much favored as a panel for a next generation projection television (TV) and a projector because the DLP optical system has a superior contrast to a contrast of a panel of liquid crystal display (LCD) devices, cathode ray tubes (CRTs), which are currently in use, and has a very simple optical structure, so that a size and weight of the system can be reduced.

The DLP optical system allows light from a lamp to be reflected by a plurality of extremely fine mirrors manufactured using a Micro Electro Mechanical System (MEMS) technology and controls brightness of a pixel corresponding to each of the mirrors. At this point, since light's brightness expresses nothing but a contrast, light is transmitted through a color wheel before the light is incident to the mirrors so that both contrast and color can be realized.

The brightness of each pixel is determined by a time for which one of the mirrors that corresponds to each pixel illuminates light from a light source onto a projection lens. Such a process is realized through pulse width modulation (PWM).

The DLP optical system uses a digital micro mirror device (DMD) developed by Texas instrument Co. The DMD is a semiconductor light switch where fine driving mirrors are integrated. In the DMD, a fine aluminum alloy mirror is installed on an upper portion of one cell of a static random access memory (SRAM), and the fine mirror is operated by a static electric field of a lower memory.

The DMD is classified into a single-chip DMD and a 3-chip DMD separating light into red, green, and blue lights, and managing the same. Both the single-chip DMD and the 3-chip DMD are complete digital type devices and have an advantage of achieving very excellent color reproduction. Besides, the DMD has a long life, a high definition, and can directly reproduce an input digital image signal without separate correction and thus realize an image without reduction of image quality.

A construction of a DLP optical system will be schematically illustrated. First, the DLP optical system includes a lamp unit emitting light, an optical engine unit for converting light introduced from the lamp unit into an appropriate image signal on the basis of an image signal input from the outside, an DMD device for reflecting an image signal transmitted from the optical engine unit, a projection lens for transmitting part of the image signal reflected from the DMD device, and a support for supporting respective elements.

The lamp unit is used as a light source for providing white light including all colors and may be a metal halide lamp. The metal halide lamp emits light by discharging electricity in a gas in order to provide brighter complete white light than that of a low-priced metal filament lamp.

The optical engine unit separates and combines colors of whit light generated from the lamp unit such that colors correspond to an image signal input from the outside to form an image and projects the formed image.

The DMD reflects an light in the form of an on-beam or an off-beam according to a signal input from the outside. The one-beam or off-beam is changed in its path by a prism and projected to the outside via the projection lens.

In detail, when needed, the DMD reflects an input signal in the form of an on-beam or an off-beam. When the input signal is reflected in the form of the on-beam, the DMD realizes a white screen. When the input signal is reflected in the form of the off-beam, the DMD realizes a black screen. There can exist a reflection angle of a DMD in an on-beam state, a reflection angle of a DMD in an off-beam state, and an intermediate angle between them. This is because the DMD realizes the on-beam state and the off-beam state by physically rotating mirrors of the DMD. Therefore, a flat state is generated when transition from the on-beam state to the off-beam state, and from the off-state to the on-state are made.

Figure 1:
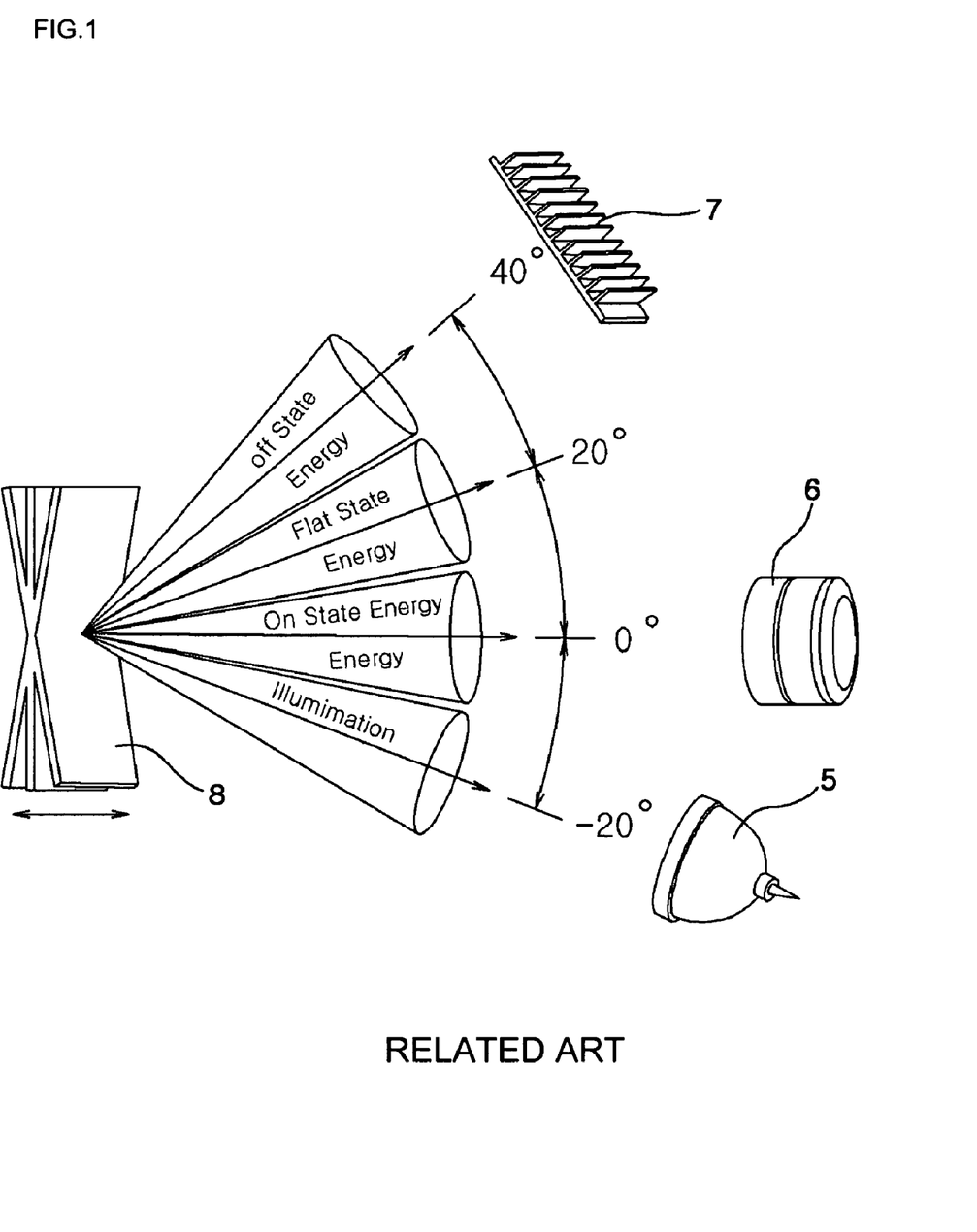
FIG. 1 is a conceptual view illustrating a light reflection path of a DMD in a DLP optical system.

A light optical path of the DLP optical system having the above-descried construction is clearly understood when a conceptual view of a light reflection path of the DMD illustrated in FIG. 1.

Referring to FIG. 1, when mirrors 8 of the DMD rotates a predetermined angle, light emitted from a lamp 5 is incident to a projection lens 6 when the light is in the on-beam state and incident to a light absorption part 7 when the light is in the off-beam state. However, in the intermediate state between the on-beam state and the off-state, light is incident to a portion not defined in an inner side of the optical system or incident to a screen via the projection lens, so that an unwanted image is formed on the screen.

The intermediate state between the on-beam state and the off-beam state will be descried in detail.

When the DMD transitions from the on-beam state to the off-beam state or vice versa, the mirrors of the DMD that reflect light go through an intermediate angle while the mirrors change between an angle corresponding to the on-beam state and an angle corresponding to the off-beam state. Therefore, even during the off-beam state, part of light is transmitted via a prism and projected onto a screen via the projection lens by the mirrors. The light projected onto the screen during the off-beam state is illuminated on an entire screen, which reduces contrast of the screen. Accordingly, black color is not perfectly realized but instead a gray color is displayed.

In detail, even when a related art DLP optical system realizes a black screen, that is, the DMD reflects all signals in the form of the off-beam, part of light is projected onto a screen via a projection lens, so that a perfect black and white screen is not realized and thus contrast of the screen is reduced.

Since such contrast reduction is always generated while mirrors of a DMD rotate, the contrast reduction is always generated when an image of any type is formed on a screen as well as a black is realized on the screen.

SUMMARY OF THE INVENTION

Accordingly, the present invention is directed to a DLP optical system that substantially obviates one or more problems due to limitations and disadvantages of the related art.

An object of the present invention is to provide a DLP optical system for improving contrast of a screen and realizing high definition image quality by completely blocking off undesired light penetrating into a projection lens.

Another object of the present invention is to provide a DLP optical system for improving image quality by preventing undesired light from being illuminated onto a normal pixel in association with an image formed on a screen.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a DLP optical system including: a lamp unit for providing light; an optical engine unit optically connected with the lamp unit, having optical parts for converting light incident from the lamp unit into an image signal therein, and including a primary lens for transmitting the image signal; a DMD for reflecting the image signal transmitted from the primary lens; a prism formed closely to the DMD, for adjusting a path of light; a projection lens for projecting an on-beam of light from the prism that contributes to image forming onto a screen; and a light-blocking part provided on an incident side of the projection lens, for transmitting only the on-beam and shielding light of a flat state region located between the on-beam and an off-beam.

In another aspect of the present invention, there is provided A DLP optical system including: a lamp unit for providing light; an optical engine unit for converting light incident from the lamp unit into an image signal; a DMD for selectively reflecting an image signal incident from the optical engine unit to an on-beam region; a prism for adjusting a path of light incident from the DMD; a projection lens for projecting light from the prism onto a screen; an engine body for receiving at least the prism; an engine cover provided on an upper side of the engine body, for protecting parts inside the engine cover; and a light-blocking part provided in an interval part between a light-emitting part of the prism and a light-incident part of the projection lens, for shielding at least light of a flat state region to improve a contrast of an image.

In a further another aspect of the present invention, there is provided a DLP optical system including: a lamp unit; an optical engine unit for converting light incident from the lamp unit into an image signal; a DMD for selectively reflecting an image signal incident from the optical engine unit to an on-beam region, an off-beam region, a flat state region formed between the on-beam region and the off-beam region; and a light-blocking part for blocking light of the flat state region among light reflected by the DMD.

According to a DLP optical system, contrast of an image formed on a screen by the DLP optical system improves, and high definition and clear image can be obtained.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

To solve a problem that part of light penetrates into a projection lens to reduce contrast of an image when a black image is realized on a screen in a DLP optical system that uses a DMD generating a path difference of a predetermined angle to a reflected beam, the present invention shields the light penetrating into the projection lens by shaping part of a shape of an engine cover 30 or using other methods, to realize a more improved black image.

Figure 2:
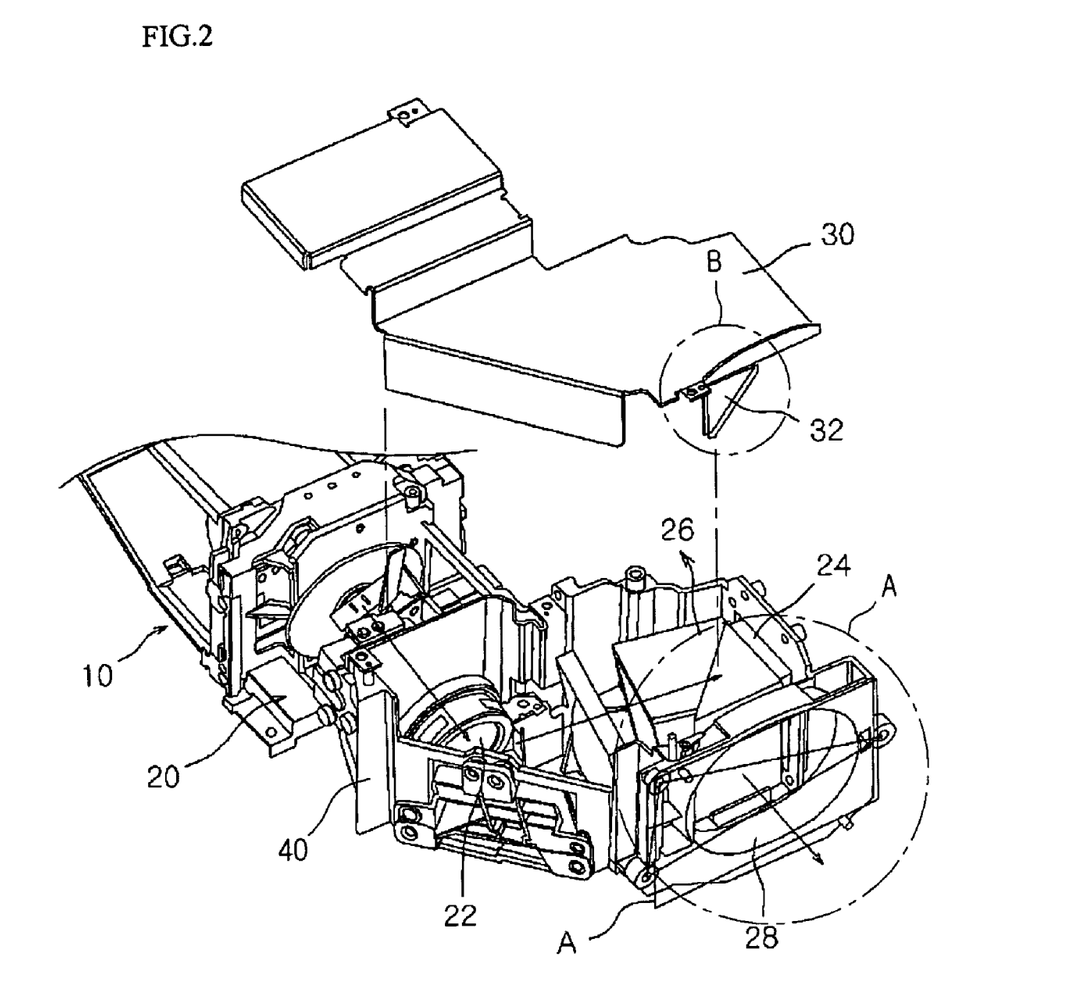
FIG. 2 is a perspective view of a DLP optical system according to the present invention.
Figure 3:
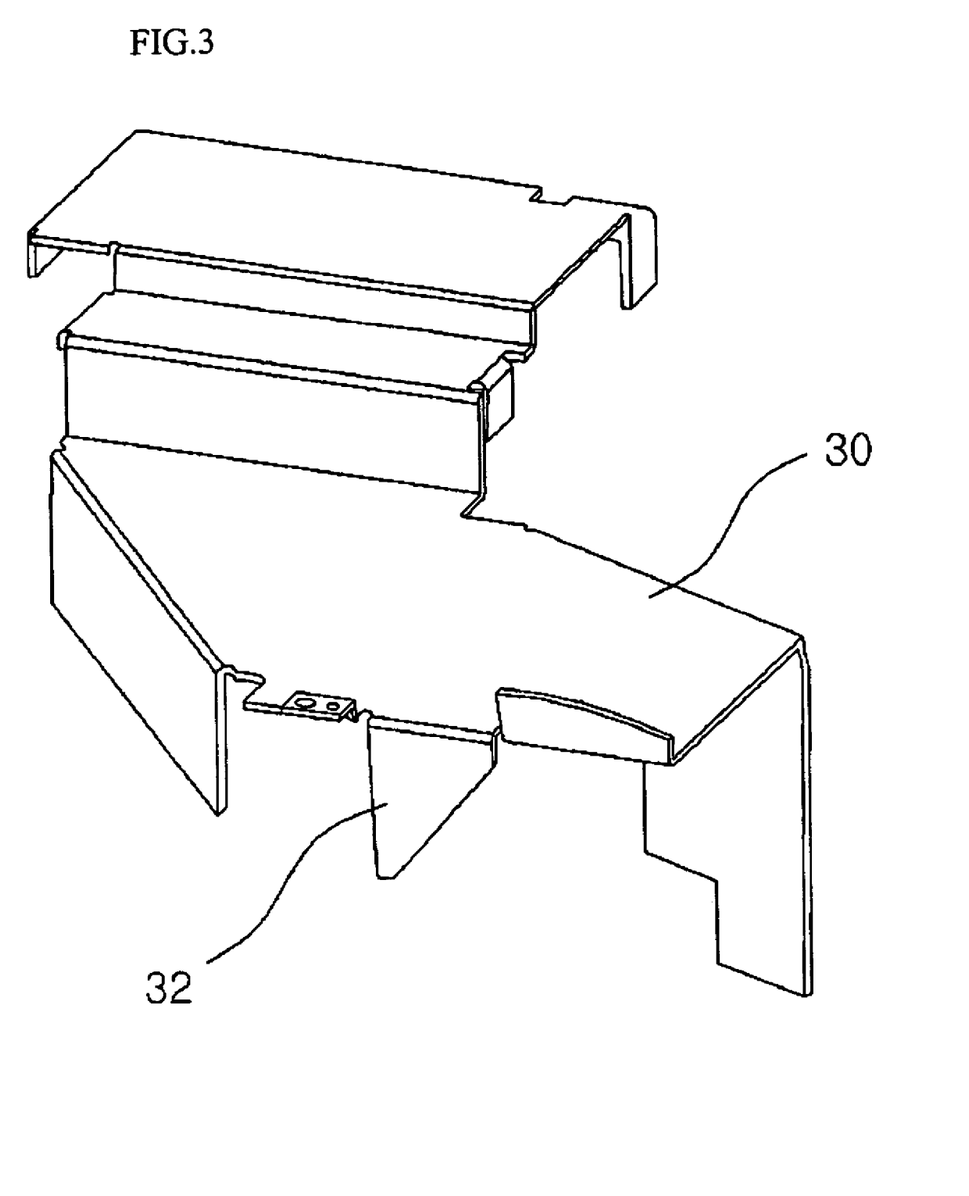
FIG. 3 is an enlarged perspective view illustrating an engine cover of a DLP optical system according to the present invention.

FIG. 2 is a perspective view of a DLP optical system according to the present invention, and FIG. 3 is an enlarged perspective view illustrating an engine cover of a DLP optical system according to the present invention.

Referring to FIGS. 2 and 3, the engine cover 30 and a light-blocking part 32 are provided.

The engine cover 30 according to an embodiment of the present invention includes the light-blocking part 32 capable of shielding part of a light-incident side of a projection lens, that is, a light-emitting side of a prism. In the case where the engine cover 30 is manufactured by molding a plate material as illustrated in FIG. 3, the plate material may be integrally formed with the light-blocking part 32 so that part of the plate material can serve as the light-blocking part 32.

Also, in the case where the engine cover 30 is manufactured by molding a metal plate with consideration of easiness in processing and an economical efficiency, the light-blocking part 32 may be formed by bending part of the engine cover 30 such that the light-blocking part 32 may be interposed between a prism and a projection lens. In the present invention, a material for the engine cover is not necessarily limited to a metal plate. Also, it would be obvious to a person of an ordinary skill in the art that the engine cover can be formed of other cheap material easy to process. For example, when the engine cover is formed of black plastics, a light-blocking material may be integrally formed with the engine cover 30 during an injection molding process.

A DLP optical system according to the present invention includes a lamp unit 10, an optical engine unit 20, a primary lens 22, a DMD 24, a prism 26, a projection lens 28, the engine cover 30, and the light-blocking part 32.

In detail, the lamp unit 10 provides light, the optical engine unit 20 is optically connected with the lamp unit 10 to convert light incident from the lamp unit 10. Conversion of light includes reflection, diffraction, and refraction of light, etc.

The optical engine unit 20 has optical parts for converting light incident from the lamp unit 10 into an image signal therein. The primary lens 22 transmits the converted image signal. A general DLP optical system technology may be easily modified and applied to the lamp unit 10 and the optical engine unit 20.

The image signal transmitted from the primary lens 22 goes through the prism 26, and is reflected by the DMD 24. When needed, the DMD 24 reflects an input signal in the form of an on-beam or an off-beam. When the input signal is reflected in the form of the on-beam, a white image is realized on a screen. When the input signal is reflected in the form of the off-beam, a black image is realized on a screen. On the other hand, as described above, there can exist an intermediate angle between a reflection angle of the DMD 24 for the on-beam and a reflection angle of the DMD 24 for the off-beam.

In detail, when the DMD 24 transitions from the on-beam state to the off-beam state or vice versa, the mirrors of the DMD 24 that reflect light go through an intermediate angle while the mirrors rotate. Therefore, even during the off-beam state, part of light is transmitted via a prism 26 and projected onto a screen via the projection lens 28 by the mirrors. The present invention further includes a light-blocking part between a light-emitting side of the prism 26 and a light-incident side of the projection lens 28 in order to simply block part of light transmitted via the projection lens 28 when the state of a beam changes. In the present embodiment, the light-blocking part 32 is formed in the engine cover 30.

A path of an on-beam reflected by the DMD 24 is controlled by the prism 26 so that the on-beam is effectively transmitted via the projection lens 28. That is, the prism 26 is optically connected with the DMD 24 so as to receive an on-beam reflected by the DMD 24, and the projection lens 28 couples to the prism 26 to effectively transmit the on-beam whose path has been controlled by the prism 26.

For this purpose, the DMD 24 couples to one side of the prism 26, and the projection lens 28 couples to the other side of the prism 26.

As described above, the lamp unit 10, the optical engine unit 20, the DMD 24, the prism 26, and the projection lens 28, which are elements of the DLP optical engine according to the present invention, are fixed in an engine body 40, so that they can be connected with one another, and an upper side of the engine body 40 is covered with the engine cover 30 to constitute the optical engine as a whole.

The present invention is characterized in forming the light-blocking part 32 for shielding a region of the projection lens 28 through which an off-beam is transmitted by simply modifying a shape of the engine cover 30 as illustrated in FIG. 3.

Though the DLP optical engine according to the present invention has the above-described construction, names of the respective elements are attached according to their functions for convenience and are not limited to the names described in the present embodiment. Therefore, when the DLP optical engine is divided into parts for providing light and parts for receiving light and transmitting an image signal, the parts for providing light include the lamp unit 10 of the present invention, and the parts for receiving light and transmitting an image signal include the optical engine unit 20, the DMD 24, the prism 26, and the projection lens 28.

The DLP optical engine of the present invention may further include a light absorption part for absorbing an off-beam. That is, an off-beam reflected by the DMD 24 is not transmitted via the projection lens 28, but part of the off-beam may be transmitted via the projection lens 28. To prevent even part of the off-beam from being reflected again and transmitted via the projection lens 28, an appropriate light absorption part may be additionally provided to absorb the off-beam, and thus prevent the off-beam from being reflected again. The light absorption part is a light absorption material provided on an inner surface of a region "B" of FIG. 2 with the engine cover coupled to the engine body. The portion where the light absorption part is provided may be the engine cover 30 on a cover on which the off-beam is incident and a portion of the engine body 40.

Also, as described above, the engine cover 30 not only serves as the light-blocking part 32 but also serves as a portion of a case of the optical engine. Accordingly, the engine cover 30 is formed to cover all the elements of the optical engine such as the lamp unit 10 and the optical engine unit 20 as well as the prism 26.

Figure 4:
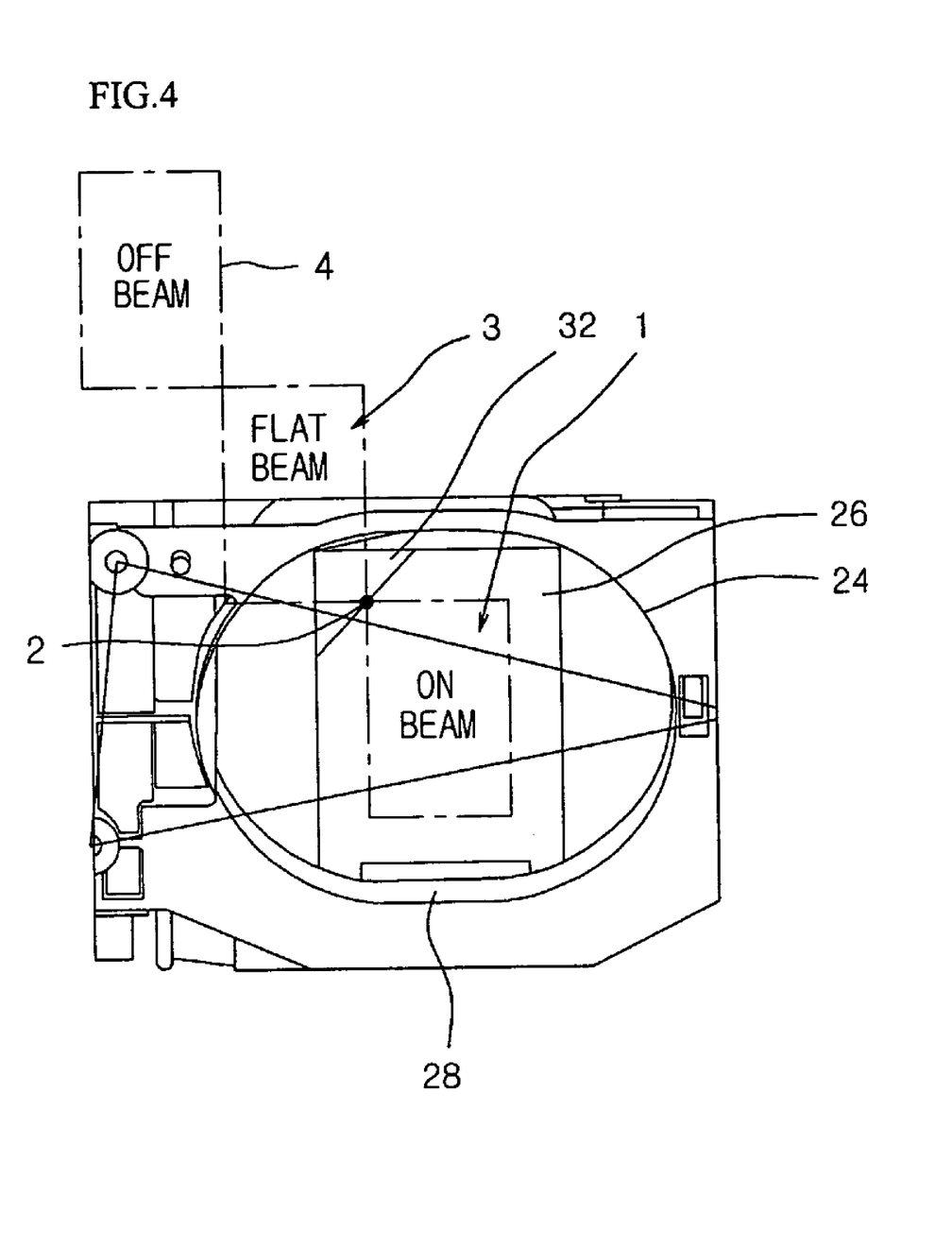
FIG. 4 is an enlarged view of a portion 'A' when a DLP optical system of FIG. 2 is assembled.

FIG. 4 is an enlarged view of a portion 'A' when a DLP optical system of FIG. 2 is assembled.

Referring to FIG. 4, an on-beam region 1, a boundary point 2, a flat state region 3, an off-beam region 4, a prism 26, a projection lens 28, and a light-blocking part 32 are illustrated.

The on-beam region 1 is a region through which correct light forming a desired image is emitted. Light passing through an inside of the on-beam region 1 is illuminated onto a screen to form a correct image. The off-beam region 4 is a region through which discarded light is illuminated. The discarded light is illuminated onto the light absorption part. The flat state region 3 is a section between the on-beam region 1 and the off-beam region 4. Light that transitions from one of the two regions to the other of the two regions is illuminated onto the flat state region 3. Though the on-beam region 1, the flat state region 3, and the off-beam region 4 are not actually separated and thus formed in a pattern continuously connected, description will be made on the assumption that they have a rectangular shape and are perfectly discriminated from one another for convenience. Here, it is natural that the on-beam region 1 is formed in a rectangular shape and light transmitted through an inside of the on-beam region 1 is projected to form a correct image onto a screen. The on-beam region 1 has a rectangular shape corresponding to the screen.

Light of an on-beam reflected by the DMD 24 is transmitted through the on-beam region 1 of the projection lens 28, and an off-beam is reflected to the off-beam region 4 illustrated in FIG. 1 and absorbed by the light absorption part. As described above, since light between the off-beam region and the on-beam region passes through the flat state region, the light may be transmitted via the projection lens 28, so that a perfect black image is not realized and contrast of the image reduces. However, according to an embodiment of the present invention, the light-blocking part 32 shields the flat state region 3 to prevent undesired light from being transmitted via the projection lens 28. Therefore, for this purpose, the light-blocking part 32 is formed to include a line passing through a boundary point 2 between the on-beam region 1 and the flat state region 3. This is to prevent the light-blocking part 32 from having an influence on the on-beam region 1 since light of the on-beam is partially shield when a portion of the light-blocking part 32 is located in the on-beam region 1. It would be easily estimated that the boundary point 2 is a corner portion of the on-beam region 1 having a rectangular shape.

Also, the light-blocking part 32 is formed in a triangular shape having as one side a line passing through the boundary point 2 between the on-beam region 1 and the flat state region 3. When considering that the off-beam is completely blocked and the on-beam is not influenced and considering easiness in processing and an economic efficiency, a most optimum shape of the light-blocking part 32 is a triangular shape illustrated in FIG. 4. However, the shape of the light-blocking part 32 is not limited to the triangular shape illustrated in FIG. 4. The light-blocking part 32 of other shape easy to process, low-priced, blocking an off-beam, and having no influence on the on-beam can be used, of course.

Figure 5:
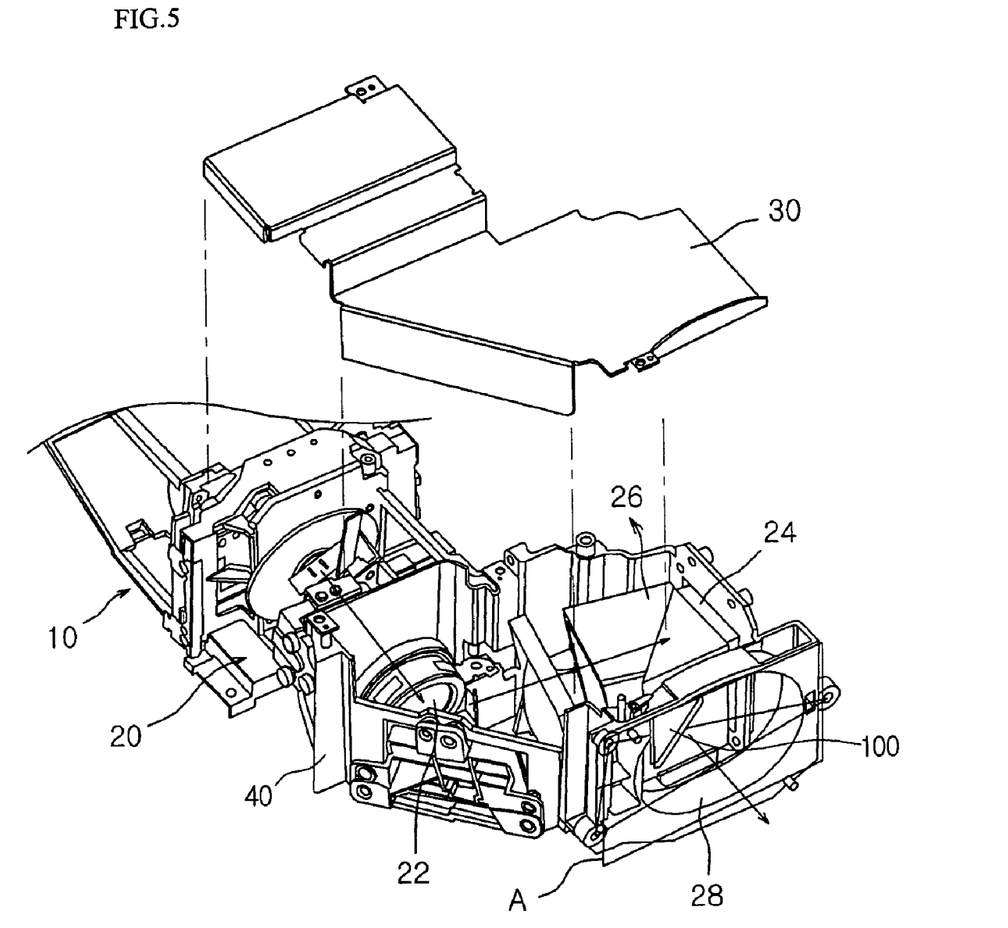
FIG. 5 is a perspective view of a DLP optical system according to another embodiment of the present invention.

FIG. 5 is a perspective view of a DLP optical system according to another embodiment of the present invention.

Referring to FIG. 5, only difference between another embodiment and the previous embodiment of the present invention is that a light-blocking part 100 for blocking light of a flat state region is formed in an engine body 40, not an engine cover 30. Since other parts not descried in detail are the same as those of the previous embodiment, detailed descriptions thereof will be omitted.

Also, in another embodiment, the light-blocking part 100 is provided in an interval part between a light-emitting side of a prism and a light-incident side of a projection lens as described in the previous embodiment. In the case where the light-blocking part 100 is integrally formed with an engine body 40, it would be easily estimated that the light-blocking part 100 is manufactured simultaneously with the engine body 40 during an injection process of the engine body 40.

Figure 6:
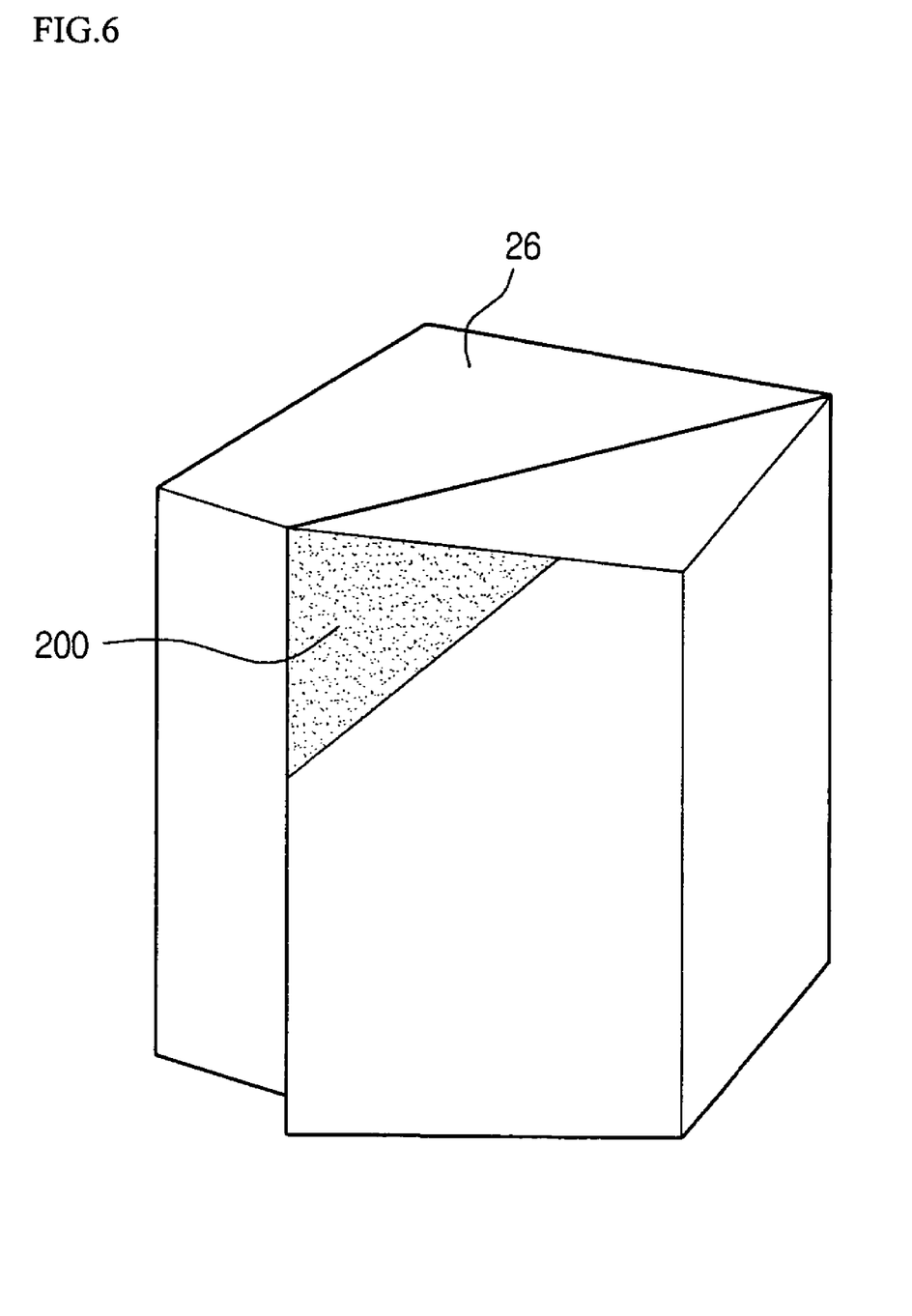
FIG. 6 is a perspective view illustrating a prism of a DLP optical system according to further another embodiment of the present invention.

FIG. 6 is a perspective view illustrating a prism of a DLP optical system according to further another embodiment of the present invention.

Referring to FIG. 6, a light-blocking part 200 is further formed on a light-emitting surface of a prism. That is, the light-blocking part 200 for blocking light is formed on the surface of the prism from which light is emitted. The light-blocking part 200 may be formed of a black film absorbing light or light-blacking paint.

On the other hand, a preferred position of the light-blocking part 200 is the light-emitting surface of the prism. When the light-blocking part 200 is formed on a light-incident surface of the prism that faces a DMD, light from the prism interferes with light incident to the DMD to hinder a normal operation of the optical system, heat load is high, and life is shortened. Also, the light-blocking part 200 may be formed on an interval part of a plurality of prisms. However, in this case, heat caused by blocked light is difficult to cool down. Therefore, the light-blocking part is problematic to actually apply. However, as long as the above problem is solved, the light-blocking part 200 can be formed on the interval parts of the prism and applied on any surface where a boundary point 2 can be defined on a light path of the prism, of course.

According to the present invention, it is possible to improve a contrast of an image easily and economically by simply modifying a shape of an engine cover or an engine body, or forming a light-blocking part on a prism without a separate apparatus, and preventing light from a flat state region from penetrating into a projection lens. Of course, a contrast of a normal image improves, so that high definition clear image quality can be realized.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A micro-mirror projection system, comprising:
   an optical engine unit including:
      optical parts configured to convert incident light into an image signal,
      a primary lens configured to transmit the image signal, and
      an engine cover configured to cover the optical parts and the primary lens;
   a DMD (digital micro mirror device) configured to reflect the image signal transmitted from the primary lens;
   a prism formed closely to the DMD and configured to adjust a path of light;
   a projection lens configured to project an on-beam of light from the prism toward a screen; and
   a light-blocking part provided on an incident side of the projection lens and configured to shield at least light of a flat state region located between the on-beam and an off-beam reflected from the DMD, such that only the on-beam passes through the projection lens,
   wherein the light-blocking part is formed by bending a part of the engine cover such that the light-blocking part is interposed between the prism and the projection lens.

2. The micro-mirror projection system according to claim 1, wherein the engine cover comprises a light absorption part configured to absorb the off-beam.

3. The micro-mirror projection system according to claim 1, wherein the engine cover is manufactured by processing a metal plate.

4. The micro-mirror projection system according to claim 1, wherein one side of the light-blocking part passes through a boundary point between a region of the on-beam and the flat state region.

5. The micro-mirror projection system according to claim 4, wherein the light-blocking part has a triangular shape.

6. The micro-mirror projection system according to claim 1, wherein the light-blocking part is formed in an interval part between a light-emitting part of the prism and a light-incident part of the projection lens.

7. The micro-mirror projection system of claim 1, further comprising:
   an engine body configured to receive the engine cover on an upper side thereof, and to accommodate at least the prism.

8. The micro-mirror projection system according to claim 7, wherein the engine body is a single part and receives the optical engine unit and the prism.

9. A micro-mirror projection system, comprising:
   an optical engine unit including:
      optical parts configured to convert incident light into an image signal therein,
      a primary lens configured to transmit the image signal, and
      an engine cover configured to cover the optical parts and the primary lens;
   a DMD (digital micro mirror device) configured to reflect the image signal transmitted from the primary lens;
   a prism formed closely to the DMD and configured to adjust a path of light;
   a projection lens configured to project an on-beam of light from the prism towards a screen;
   light absorption parts provided on an inner surface of at least the engine cover and configured to absorb an off-beam reflected from the DMD; and
   a light-blocking part provided on an incident side of the projection lens, such that only the on-beam passes through the projection lens by shielding at least light of a flat state region which is located between the on-beam and the off-beam reflected from the DMD,
   wherein the light-blocking part is integrally provided to the engine cover, the engine cover being formed by processing a metal plate.

10. The micro-mirror projection system according to claim 9, wherein one side of the light-blocking part passes through a boundary point between an on-beam region and the flat state region.

11. The micro-mirror projection system according to claim 10, wherein the light blocking part has a triangular shape.

12. A micro-mirror projection system, comprising:
   an optical engine unit including:
      optical parts configured to convert incident light into an image signal therein, a primary lens configured to transmit the image signal,
an engine body on which the optical parts and the primary lens are mounted, and
an engine cover coupled to the engine body and configured to cover the optical parts and the primary lens;
a DMD (digital micro mirror device) configured to reflect the image signal transmitted from the primary lens;
a prism formed closely to the DMD and configured to adjust a path of light;
a projection lens configured to project an on-beam of light from the prism towards a screen;
light absorption parts provided on an inner surface of at least the engine cover and configured to absorb an off-beam reflected by the DMD; and
a light-blocking part integrally and vertically provided to the engine body at an incident side of the projection lens, such that only the on-beam passes through the projection lens by shielding at least light of a flat state region which is defined between the on-beam and the off-beam reflected from the DMD.

* * * * *